United States Patent [19]
Johnson

[11] Patent Number: 5,640,422
[45] Date of Patent: *Jun. 17, 1997

[54] DIGITAL COMMUNICATIONS MODULATION METHOD AND APPARATUS

[75] Inventor: Neldon P. Johnson, American Fork, Utah

[73] Assignee: International Automated Systems, Inc., American Fork, Utah

[*] Notice: The term of this patent shall not extend beyond the expiration date of Pat. No. 5,517,528.

[21] Appl. No.: 533,618

[22] Filed: Sep. 26, 1995

Related U.S. Application Data

[63] Continuation-in-part of Ser. No. 285,030, Aug. 2, 1994.

[51] Int. Cl.$^6$ .................................................. H04L 27/00
[52] U.S. Cl. .................. 375/259; 375/260; 370/458; 370/498
[58] Field of Search ...................... 375/259, 260, 375/295; 370/95.1, 95.3, 110.1, 110.4; 455/59

[56] References Cited

U.S. PATENT DOCUMENTS

| | | | |
|---|---|---|---|
| 3,805,191 | 4/1974 | Kawai | 332/9 |
| 3,890,620 | 6/1975 | Toman | 343/108 |
| 4,001,728 | 1/1977 | Schneider | 332/1 |
| 4,103,238 | 7/1978 | Deming | 325/141 |
| 4,347,616 | 8/1982 | Murakami | 375/20 |
| 4,387,455 | 6/1983 | Schwartz | 370/11 |
| 4,584,692 | 4/1986 | Yazuka | 375/38 |
| 4,766,589 | 8/1988 | Fisher | 370/98 |
| 5,220,557 | 6/1993 | Kelley | 455/103 |
| 5,274,672 | 12/1993 | Weiss | 375/305 |
| 5,364,536 | 11/1994 | Tsujimoto | 375/363 |
| 5,369,669 | 11/1994 | Tombal et al. | 370/110.4 |
| 5,390,185 | 2/1995 | Hooijmans et al. | 370/98 |

*Primary Examiner*—Stephen Chin
*Assistant Examiner*—T. Ghebretinsae
*Attorney, Agent, or Firm*—J. David Nelson

[57] ABSTRACT

A method and apparatus for single signal, multiple channel digital information transfer through waves with time slot allocation. The apparatus consists of one or more transmitting devices and one or more receiving devices. Multiple source signals are each allocated a unique time slot between successive synchronization waves. Digital signals from each source are converted to analog information waves having a positive wave segment and a negative wave segment. The ratio of the amplitude of the positive wave segment to the amplitude of the negative wave segment, the positive-to-negative ratio, for each signal source, is a function of the magnitude of the source digital. The sum of the amplitude of the positive wave segment and the absolute value of the amplitude of the negative wave segment, the positive-to-negative offset, is maintained at a pre-set value at transmission. The total signal, which consists of successive synchronization waves interspersed with information waves for each signal source, each within its allocated time slot, is transmitted to the receivers which extract the positive-to-negative ratio and positive-to-negative offset for each signal source, calibrate the received signals and generate output signals which reproduce the transmitted inputs.

53 Claims, 6 Drawing Sheets

LEGEND
1- Transmission Apparatus
2- Digital to Analog Signal Generator
3- Digital Input
4- Composite Signal Generator
5- Sync Pulse Receiver
6- Positive-to-Negative Offset
7- Sync Pulse
8- Sync Pulse Generator
9- Information Pulse
10- Transmitter
11- Synchronized Information Pulse
14- Control Receiver
15- Master Control Circuit
39- Positive Wave Segment
40- Negative Wave Segment
41- Amplitude of Positive Wave Segment
42- Amplitude of Negative Wave Segment
43- Zero Crossing Reference

DIGITAL COMMUNICATIONS MODULATION METHOD AND APPARATUS

REFERENCE TO PRIOR FILED CO-PENDING APPLICATION

This application is a continuation-in-part application for a prior filed and co-pending U.S. patent application. The Ser. No. of the prior application is 08/285,030 and the filing date is Aug. 2, 1994.

FIELD OF THE INVENTION

This invention relates to methods and apparatuses for modulation of electromagnetic waves for information transfer and more particularly to methods and apparatuses for modulating electromagnetic waves for digital information transfer.

BACKGROUND OF THE INVENTION

There are several principal modulation methods for electromagnetic signals used in communications. The ones that are most widely used are frequency modulation (FM), amplitude modulation (AM), pulse width modulation (PWM) and phase modulation (PM). There have also been some other less widely used methods for transmitting and receiving information by means of electromagnetic signals. The demands of modern information transfer, in particular computer networking and multi-media communications, have increased the need to transmit more and more information on limited channels of communication. With the ever increasing capacity of digital computers, there is an ever increasing demand for modulation methods to enhance the volume of digital data that can be transmitted and received.

Methods have been developed for increasing the amount of information that can be transmitted and received. One such method is described in U.S. Pat. No. 4,387,455 to Schwartz. This method utilizes several different modulation systems at the same time over the same channel. However, this method uses FM and AM modulation and requires several cycles for each digital bit. Similarly the device disclosed in U.S. Pat. No. 4,103,238 to Deming, provides for three modulation patterns to be transmitted simultaneously on a single carrier wave. Again, multiple cycles are required for each digital bit. The deficiencies of these methods are typical of efforts to increase the amount of information transmitted.

The method disclosed in U.S. Pat. No. 4,584,692 to Yazuka relies on the same common modulation methods but introduces polarity modulations as a means of enhancing the amount of information that can be transmitted. The polarity of the waves is modulated to encode information and then the original wave and the modulated wave are compared to allow decoding of the information. This results in a modest increase in the amount of information that can be transmitted over a single signal.

Various methods designed specifically for digital information transfer provide some enhancement of the data transfer capabilities. The method disclosed in U.S. Pat. No. 4,001,728 to Schneider is a method of transmitting digital signals through the use of pulse width modulation on an incremental ramp wave. A method of transmitting multiple digital signals on a single carrier wave is disclosed in U.S. Pat. No. 4,347,616 to Murakami. Another method providing for the simultaneous transmission of multiple digital signals independently modulated is disclosed in U.S. Pat. No. 3,805,191 to Kawai.

The method disclosed in U.S. Pat. No. 3,890,620 to Toman provides for the modulation of a carrier wave at prescribed time intervals with digital information. This method, however, points up the limitations of attempts to enhance existing methods of digital information transfer. Incoming digital data must first be stored and then it is recalled for transmission at a rate compatible with the carrier wave modulation. The receiver then extracts the digital information from the signal by synchronization with the transmitter. The resultant signal is subject to interference at both the carrier frequency and the modulation frequency.

U.S. Pat. No. 5,364,536 to Tsujimoto discloses a means of modulating a "data burst" on a carrier signal. Tsujimoto uses a modulation scheme to add a sync burst to the modulated carrier signal. This is accomplished by taking a delayed version of the data burst and the non-delayed data burst and taking the difference. This creates an artificial null in the frequency spectrum of the signal. This null spectrum sync burst is added to the signal before signal transmission. Thus for Tsujimoto, the sync burst becomes a signature burst for identifying the data burst. This method, as with the other known methods, relies upon the modulation of a carrier signal. It also does not provide for allocating time slots to multiple information signals. Also, for Tsujimoto the output digital signal is not calibrated. Instead, the signal strength of the carrier wave is calibrated. The null spectrum sync burst is not used for calibrating the received signal.

The present invention is a method and apparatus for transmitting digital communications. The present invention's primary advantage over traditional modulation techniques is the quantity of digital information that can be transmitted and received. Both FM and AM modulation were developed for transmitting analog signals and, for that reason, are cumbersome in transmitting digital signals. The present invention is designed specifically for transmitting digital signals.

This method does not require a carrier wave to transmit the information. Depending upon the information signal sources and the frequencies utilized, thousands of times more information can be transmitted. In FM systems hundreds and even thousands of cycles are required for just one bit of information. This is also true for AM modulation systems. The present invention provides for the placement of two bytes or more of information in each and every cycle. Another advantage of the present invention is the enhanced signal to noise ratio.

One objective of the present invention is to provide a digital information transfer method which does not require a carrier wave.

Another objective of the present invention is to provide a method and apparatus which substantially increases the amount of digital information that can be transmitted on a single signal.

A further objective is to provide a method and apparatus for transmitting and receiving multiple channels of information on a single communication signal.

A still further objective of the present invention is to provide a method and apparatus for continuously synchronizing a transmitter and receiver so that multiple channels of information can be reliably transmitted on a single communication signal by allocation of time slots to each channel.

A still further objective is to provide a method and apparatus for received signals to be calibrated by the receiver to compensate for signal attenuation, losses, noise, distortion and interference, and thereby to provide for very accurate read out of the digital information transmitted.

A still further objective is to provide a method and apparatus for digital information transfer which can utilize either a common synchronized transmitter or a plurality of remote synchronized transmitters and can utilize either a common receiver or a plurality of receivers.

A still further objective is to provide a method and apparatus for digital information transfer which will increase the signal to noise ratio of the received signals in comparison to other known methods.

SUMMARY OF THE INVENTION

The present invention provides a method and apparatus for increasing the amount of digital information that can be transmitted over an electromagnetic signal. The apparatus of a preferred embodiment of the present invention includes computer circuits and transmission and receiving devices. Embodiments of the apparatus can include multiple transmitters at multiple locations or a single transmitter which is accessed by each signal source. Under either embodiment, each signal source is allocated a time slot for each successive cycle between synchronization pulses. If multiple transmission locations and transmission apparatuses are utilized, each such transmission apparatus is equipped with an analog receiver for receiving synchronization pulse transmissions from a master synchronization pulse transmitter. Each remote signal source is allocated a unique time slot between successive synchronization pulses for transmission of information simultaneously with other remote signal sources which are each allocated a different time slot between the successive synchronization pulses. Likewise, if a common transmission location and transmission apparatus is utilized, each signal source that accesses the system is allocated a unique time slot between successive synchronization pulses which are generated by the master synchronization pulse transmitter.

For each signal source, the digital value of the source signal during its allocated time slot, is converted, under a preferred embodiment, to an analog pulse, called an information pulse, which is comprised of a positive wave segment and a negative wave segment, with the sum of the amplitude of the positive wave segment and the absolute value of the amplitude of the negative wave segment of the information pulse, hereafter referred to as the information pulse positive-to-negative offset, being a pre-selected value, and the ratio of the amplitude of the positive wave segment to the amplitude of the negative wave segment of the information pulse being a function of the value of the digital input. In other words, under a preferred embodiment, the positive-to-negative offset is held constant, and the value of the digital input determines the ratio of the amplitudes of the positive and negative wave segments.

Under other embodiments, the reference value for the measurement of the amplitudes of the positive and negative segments can be any positive or negative value.

Within the allocated time slot for the information pulse, the transmission apparatus generates the information pulse with its positive and negative components. The positive-to-negative offset is the calibration control for the signal and is set at a constant value. Whether the embodiment utilizes remote transmission locations and apparatuses or a common transmission location and apparatus, an information pulse is generated for each signal source for each cycle of its allocated time slot.

The information pulse generated for each signal source is transmitted in that time slot for each successive cycle of the synchronization pulses. These transmissions may be from remote locations or from a common location and may be wireless or may be transmitted via any of the well known media.

The period of each information pulse is determined by the ability of the receiving circuits to handle them, but will generally be as small as possible to reduce the effects of noise and distortion.

The receiving apparatus calibrates each information signal for each channel respectively by using the information pulse positive-to-negative offset for the information signal as measured by the receiving apparatus, adjusting the positive-to-negative offset to the known value at transmission, and then computing the ratio of the amplitude of the positive wave segment to the amplitude of the negative wave segment. This ensures that the effects of signal attenuation, losses, noise, distortion and interference are minimized. The calibrated amplitudes ratio is then used with the known function that was used to generate the amplitudes ratio at the transmission location, to generate an output digital signal.

The receiving apparatus also preferably performs a zero crossing reference check to enhance calibration. This is best accomplished if a brief zero wave segment is placed in each information pulse between the positive and negative wave segments. Then preferably the initial step in calibration is a zero correction for the zero wave segment. After the zero wave segment in the received information pulse is corrected to zero, the rest of the calibration process is completed. This zero correction enhances the effectiveness of the subsequent proportional calibration.

The synchronization pulses provide for continuous synchronization of the transmitting apparatus and the receiving apparatus so that channel tracking integrity is maintained at all times. A common receiver can be utilized from which the various channels of information are disseminated to users or a plurality of receivers can be utilized at various points of use or dissemination.

DETAILED DESCRIPTION OF THE PREFERRED EMBODIMENTS

Figure 1:
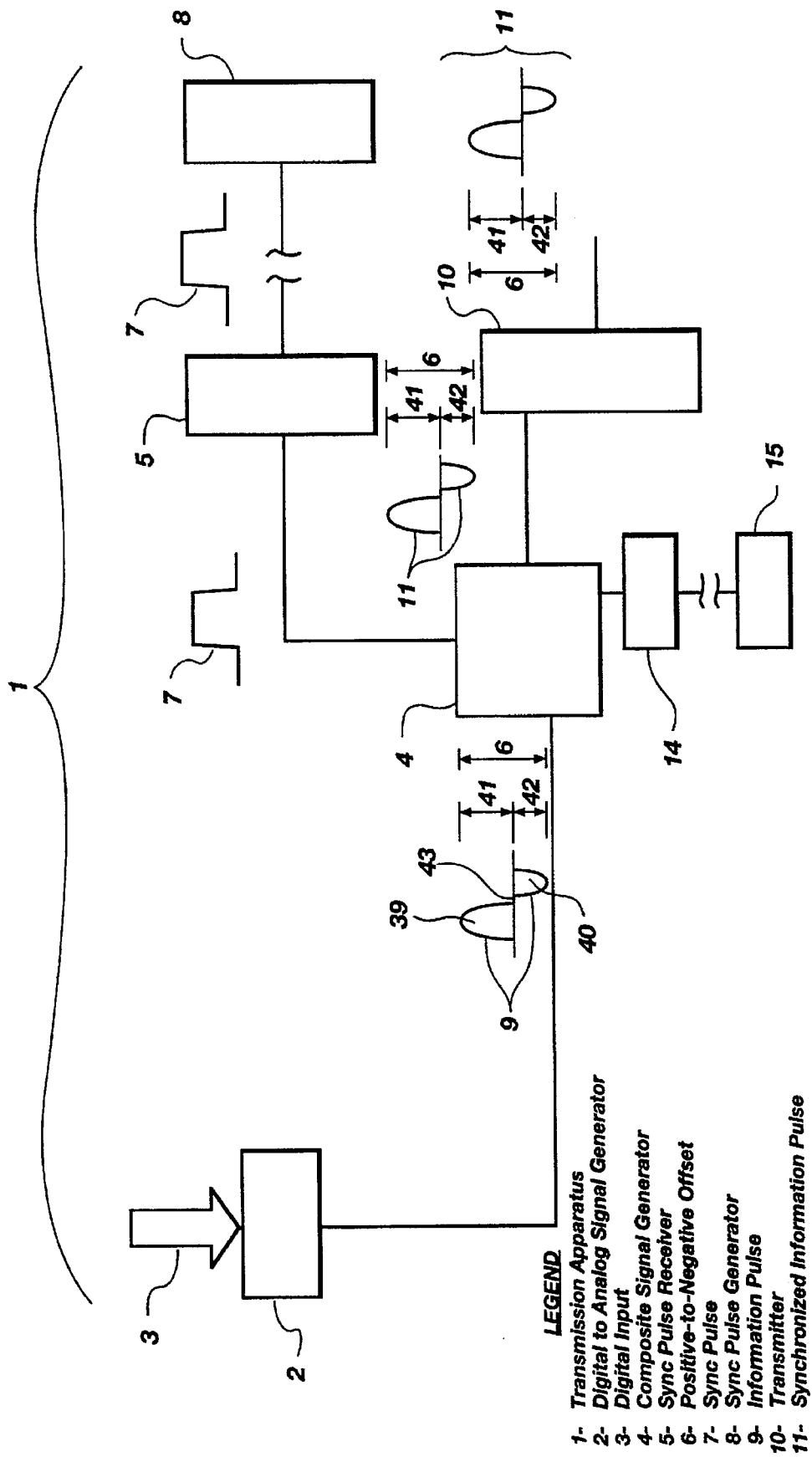
FIG. 1: A schematic of a transmission apparatus of the invention for remote transmission.

Referring first to FIG. 1, there is indicated generally therein a schematic of a preferred embodiment of a transmission apparatus 1 of the invention. This embodiment of the transmission apparatus is utilized for remote, simultaneous transmission of digital signals. Under this embodiment, the transmission apparatus comprises a digital to analog signal generator 2, a composite signal generator 4, a master control circuit 15, a control receiver 14, a remote master synchronization pulse generator 8, a synchronization pulse receiver 5, and a transmitter 10.

Under this embodiment, a digital input 3, for each signal source, is input to its respective transmission apparatus 1. Synchronization pulses 7 of a selected uniform wave form and frequency are generated by the master synchronization pulse transmitter 8 and are transmitted to each of the remote transmission apparatuses 1 where it is received by the analog synchronization pulse receiver 5. The synchronization pulses can be either voltage pulses or power pulses. Each of the signal sources is allocated a time slot between the successive synchronization pulses by the remote master control circuit 15 and the digital value of each signal source at each of its successive allocated time slots is converted to an analog information pulse 9, the positive-to-negative offset 6 of which, under a preferred embodiment, is a pre-set value and the ratio of the amplitude 41 of the positive segment 39 and the amplitude 42 of the negative segment 40 of the information pulse 9 is a function of the digital value of the source signal 3. For some embodiments the ratio of the amplitudes is simply proportional to the value of the input digital signal. For other embodiments, the ratio of the amplitudes of the positive and negative segments of the information pulse is determined through the use of an algorithm based upon the digital input value.

In preferred embodiments, the output signal from the digital to analog signal generator 2 is an analog information pulse 9 which has a pre-set positive-to-negative offset 6 and for which the ratio of the amplitude 41 of the positive segment 39 and the amplitude 42 of the negative segment 40 is a function of the digital value of the input signal. Under preferred embodiments, the information pulse is a voltage pulse, but under other embodiments the information pulse may be a power pulse.

Under a preferred embodiment for a remote transmission apparatus 1 as shown in FIG. 1, the composite signal circuit 4 may receive continuous transmissions or discrete transmissions of the information pulse, and, by monitoring the synchronization pulses 7 and the control signal from the control receiver 14, passes the information pulse to the transmitter 10 only during its allocated time slot.

Figure 2:
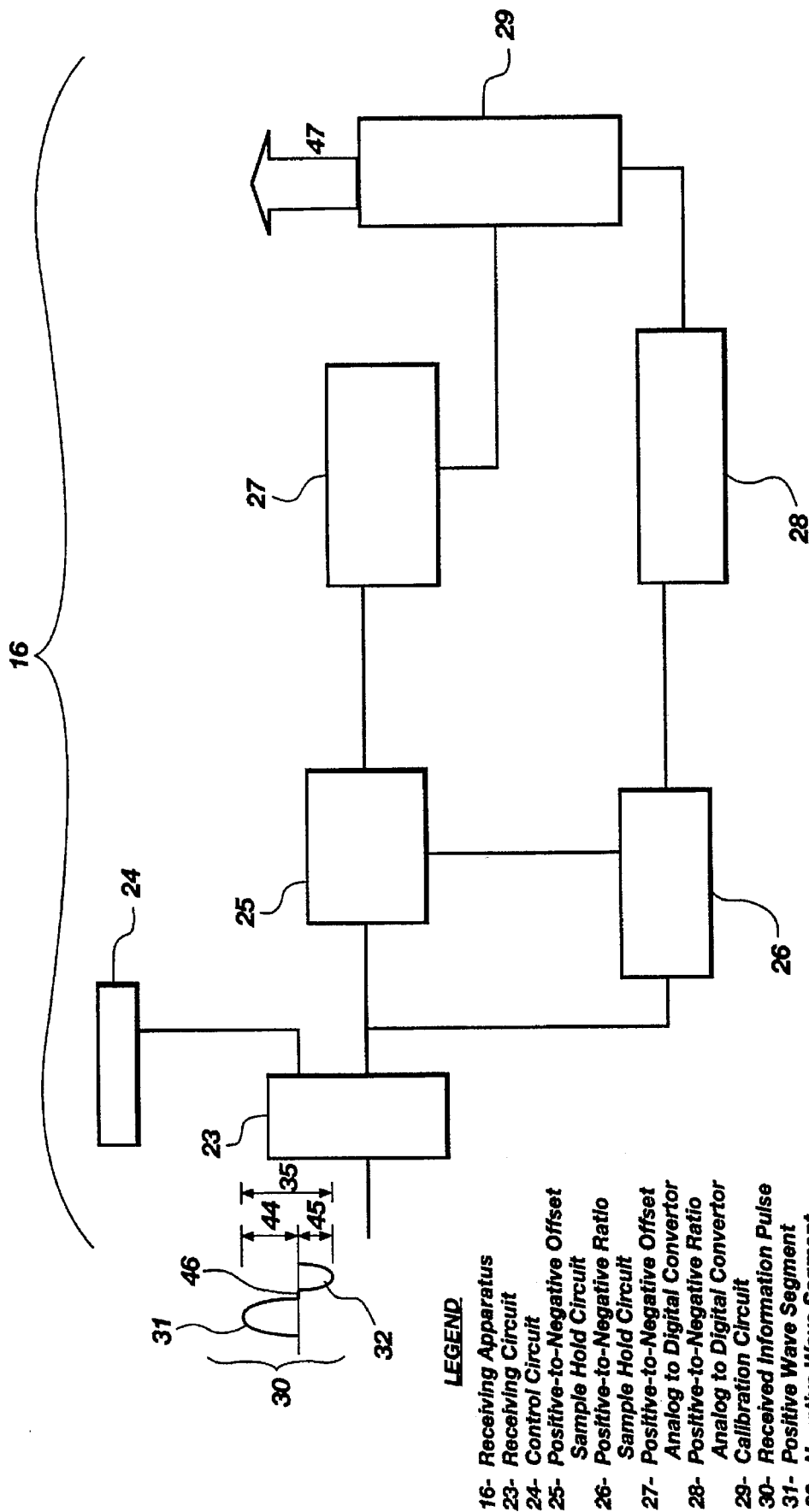
FIG. 2: A schematic of a receiving apparatus of the invention.
Figure 3:
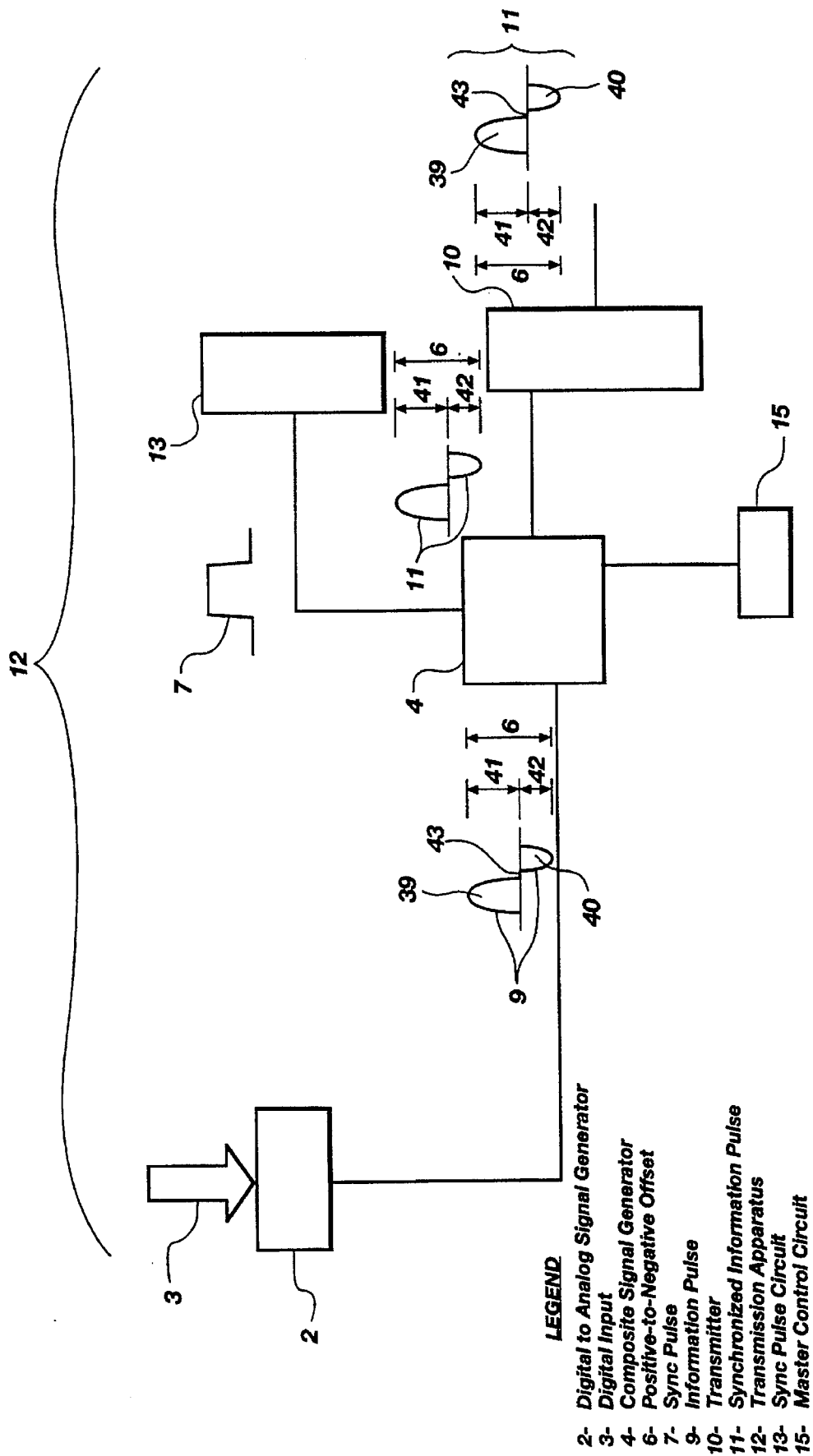
FIG. 3: A schematic of a transmission apparatus of the invention for common transmission.

Referring now to FIG. 3 which shows another preferred embodiment of the transmission apparatus, a common transmission apparatus 12 simultaneously accepts digital signals 3 from one or more sources. A synchronization pulse circuit 13 generates synchronization pulses 7 of a pre-set magnitude, wave form and frequency. The master control circuit 15 allocates each signal source a time slot between successive synchronization pulses. For each cycle of the synchronization pulse, an information pulse 9 is generated for each input signal within its allocated time slot by the digital to analog signal generator 2. The composite signal circuit 4 may receive continuous transmissions or discrete transmissions of the information pulse, and, by monitoring the synchronization pulses 7 and the control signal from the control receiver 14, passes the information pulse to the transmitter 10 only during its allocated time slot. The information pulse for each signal source is transmitted by the common transmission apparatus 12 to the receiving apparatus 16 shown on FIG. 2.

Figure 4:
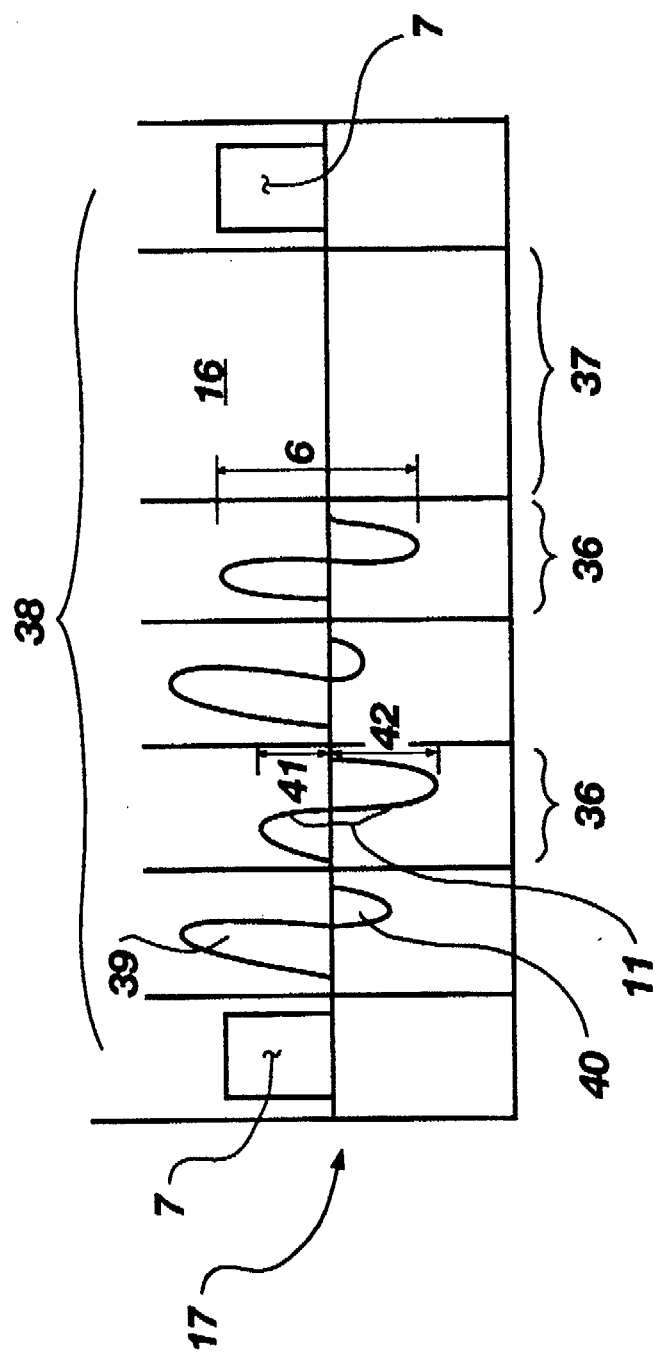
FIG. 4: An illustration of an example of a total transmitted and received signal.

Whether an embodiment of the transmission apparatus providing for the remote and separate transmission of analog information pulses 11 for signal sources as shown in FIG. 1 or an embodiment providing for the transmission of information pulses for signal sources from a common transmission apparatus as shown in FIG. 3, is used, the total signal 17 as illustrated in FIG. 4, is the same for the same source signals. Under the embodiment shown in FIG. 1, the synchronization pulses are transmitted by the master synchronization pulse generator 8, and each of the time slotted information pulses 11 are transmitted from the various remote transmission apparatuses 1. The total signal received by a receiver 16 then consists of successive synchronization pulses 7 coming from the master synchronization pulse generator 8 interspersed with the time slotted information pulses coming from the various remote transmitters 10. Under the embodiment shown in FIG. 3, the total signal received by a receiving apparatus 16 is comprised of the successive synchronization pulses interspersed with the time slotted information pulses coming from the common transmitter 10.

Under a preferred embodiment, the synchronization pulses are of a uniform, rectangular and positive voltage wave form, with a uniform frequency selected as desired. The synchronization pulses allow a receiving apparatus 16 to continuously verify the time slots of the incoming signal 17 so that the respective information pulses can be extracted from the correct assigned time slots or channels. The minimum frequency of the synchronization pulse will be dependent upon the nature of the information being transmitted over the various channels. For example, approximately 1,000 television channels can be transmitted with a single signal with this invention as it is limited only by minimum frequency at which successive audio and video signals must be received to produce the desired resolution for video and audio reproduction. Other types of media or signal types have different requirements which will affect the minimum frequency of the synchronization pulse. The frequency of the synchronization pulse, therefore, would be adjusted depending upon the application.

Under a preferred embodiment, the information pulse has a sinusoidal waveform. This allows the signal to be transmitted with a narrow bandwidth. However, other embodiments may utilize a variety of waveforms for the information pulse.

Under preferred embodiments, both for the remote transmission apparatus as shown in FIG. 1 and the common transmission apparatus as shown in FIG. 3, the information pulse generated by the digital to analog signal generator has a zero crossing reference 43 between the positive and the negative segments. Under preferred embodiments, this zero crossing reference is a brief zero wave segment between the positive and negative segments, which is used by the receiving apparatus to check the zero point of the received information pulse at this interim segment. The brief zero wave segment makes it easier for the receiver calibration circuit 29 to find the exact zero crossing. This enhances the signal to noise ratio because even if there was some non-symmetrical noise added to the signal, the effect on the zero crossing would be less than for the other wave segments. A zero correction at this interim segment then enhances the effectiveness of the other calibration techniques, which, under preferred embodiments, involve proportional calibration using the information pulse positive-to-negative offset.

For the common transmission apparatus shown in FIG. 3, the master control circuit 15 monitors and tracks all of the incoming signals and allocates time slots or channels for the respective information pulses for each of the accepted incoming signals. Referring to FIG. 4, the total signal 17 that is transmitted by the transmission apparatus is comprised of synchronization pulses 7 of a selected uniform wave form and frequency and information pulses 11 for each information channel. The time between the respective synchronization pulses 38 is determined by the nature of the signals being transmitted and the total number of channels being transmitted. For the remote transmission apparatus shown in FIG. 1, one master control circuit 15 monitors and tracks all the source signals and allocates time slots or channels for each of the accepted signals and transmits this control information to a control receiver 14 for each remote transmission location and transmission apparatus 1.

Figure 5:
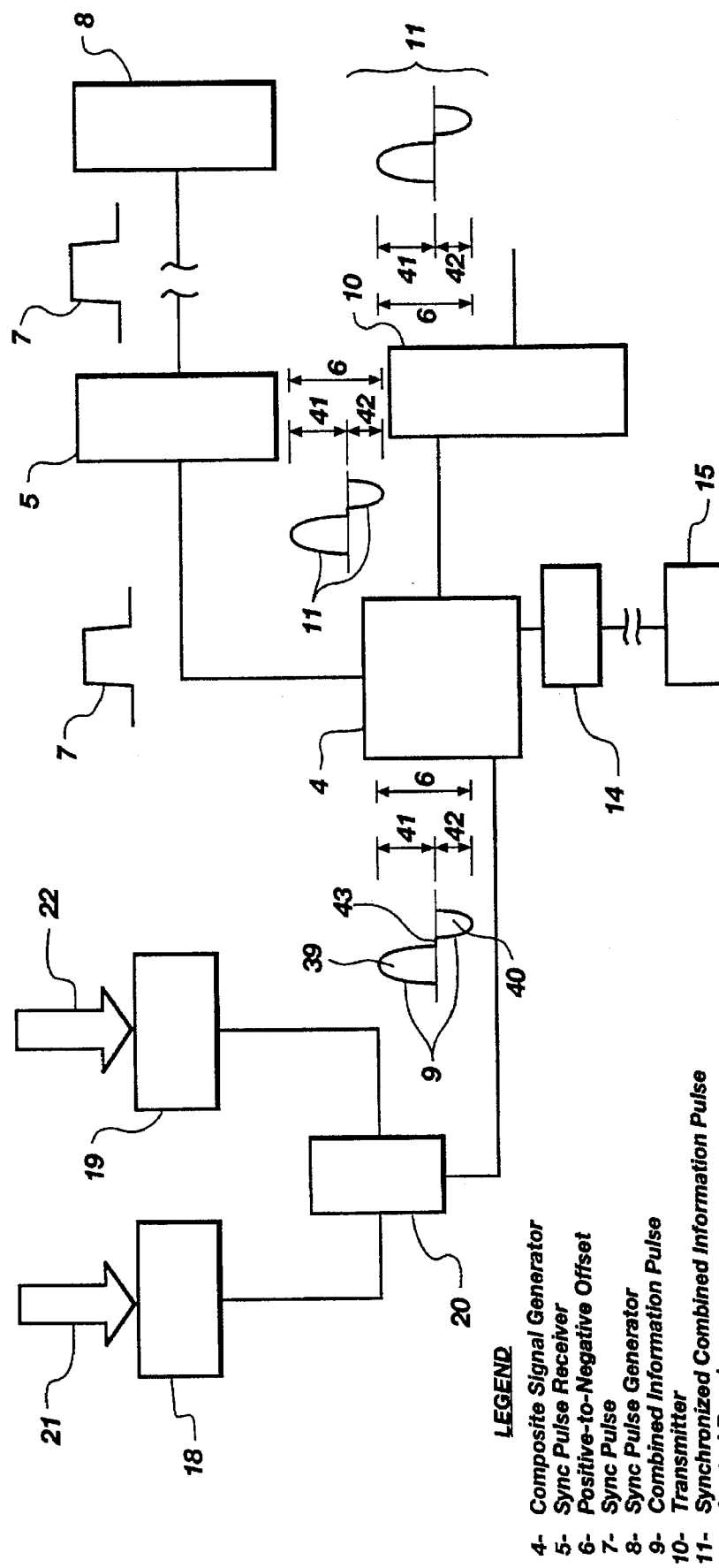
FIG. 5: A schematic of a transmission apparatus of the invention for remote transmission with a circuit for combining two signals.
Figure 6:
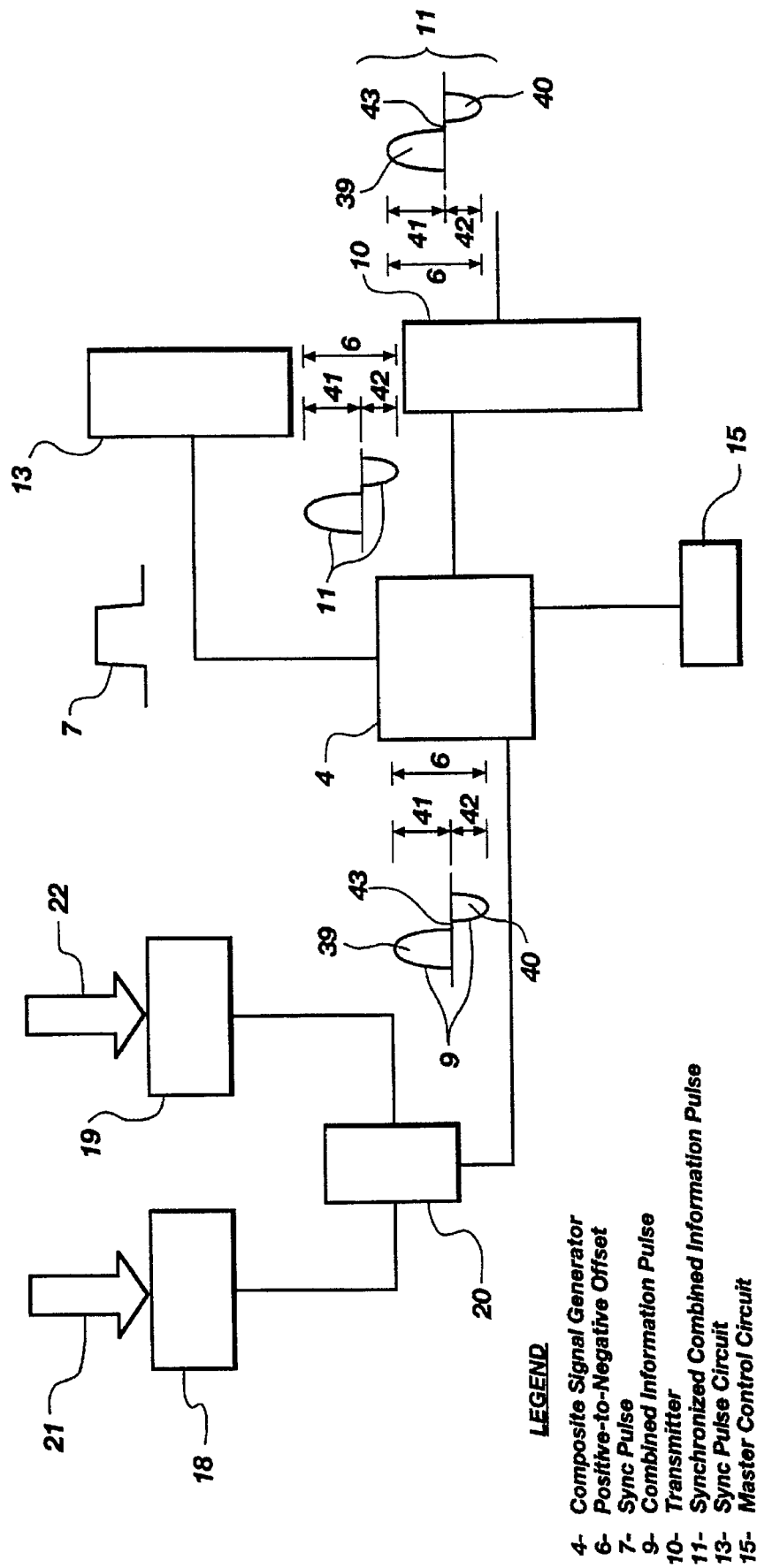
FIG. 6: A schematic of a transmission apparatus of the invention for common transmission with a circuit for combining two signals.

Other embodiments of the invention, whether for remote transmission as shown in FIG. 5 or for common transmission as shown in FIG. 6, provide for further enhancement of the amount of information that can be transmitted by incorporating a first digital to analog convertor 18, a second digital to analog convertor 19, and an added signal generator 20, which allows a first digital byte input 21 and a second digital byte input 22, such as the video and audio signals for a television transmission, to be converted from digital to analog and then added and converted into a single information pulse by the added signal generator 20. The total signal for a given time slot or channel is then a combined signal that can be transmitted as one.

The embodiments shown in FIG. 5 and FIG. 6 could also be used to combine two input signals with one being converted to a positive analog signal and the other to a negative analog signal by the digital to analog convertors 18 & 19.

While for preferred embodiments, the synchronization pulses and the information pulses are voltage pulses, other embodiments may utilize power pulses. Also, while for preferred embodiments the ratio of the amplitude of the positive wave segment to the amplitude of the negative wave segment of an information pulse is directly proportional to its corresponding digital input value, other embodiments may provide for the ratio to be determined by an algorithm based on the digital input value.

FIG. 4 illustrates the total signal 17 transmitted and received, whether remote transmission (FIG. 1) or common transmission (FIG. 3) is utilized. The total signal 17 consists of one or more information pulses 11 within their respective time slots 36, interspersed between successive synchronization pulses 7. The period, magnitude and wave form of the synchronization pulses 7 is uniform and adjustable. Each signal source is admitted to the network by the master control circuit 15 and allocated a time slot 36. Unallocated time space 37 between synchronization pulses is available for subsequent allocation to other signal sources.

Other embodiments may provide for interaction between the master control circuit 15 and the synchronization pulse generator 8 (FIG. 1) or 13 (FIG. 3) so that the frequency of the synchronization pulses is adjusted, based upon the number of channels being transmitted.

Referring now to FIG. 2, there is indicated generally therein a preferred embodiment of a receiving apparatus 16. This embodiment comprises a receiving circuit 23, a control circuit 24, a positive-to-negative ratio sample hold circuit 25, positive-to-negative offset sample hold circuit 26, a positive-to-negative ratio analog to digital convertor 27, a positive-to-negative offset analog to digital convertor 28, and a calibration circuit 29. For embodiments of the transmission apparatus as shown in FIG. 1, which provide for the remote transmission of time slotted signals, the receiving apparatus 16 receives the incoming total signal 17. The receiver control circuit 24 uses the synchronization pulses to allocate and maintain channel separation. The receiver control circuit 24 may also control which signals are allowed to pass through the receiving circuit 23. The receiving circuit 23 first makes a zero check for the zero crossing reference 46 of the received information pulse 30 and makes a zero correction of the received information pulse. The receiving circuit 23 then determines the positive-to-negative offset 35 of the information pulse and the ratio of the amplitude 44 of the positive wave segment 31 to the amplitude 45 of the negative wave segment 32 for each time slot or channel. The positive-to-negative offset sample hold circuit 25 extracts the maximum positive-to-negative offset value for each time slot or channel for each cycle of the received channel signal. Likewise, the positive-to-negative ratio sample hold circuit 26 extracts the maximum positive-to-negative ratio value for each channel. The receiver control circuit 24 establishes the channel time slots for the positive-to-negative offset sample hold circuit 25 and the positive-to-negative ratio sample hold circuit 26.

The positive-to-negative offset analog to digital converter 27 converts the values obtained by the positive-to-negative offset sample hold circuit 25 for each channel to digital. The positive-to-negative ratio analog to digital converter 28 converts the values obtained by the positive-to-negative sample hold circuit 26 for each channel to digital. Under a preferred embodiment, the analog to digital converters 27 and 28 are special flash analog to digital converters.

Other embodiments of the invention may use the analog value of the positive-to-negative offset to calibrate the received analog signal. For those embodiments this will preferably occur after the zero check and correction is made. The calibration is made to the wave before the analog positive-to-negative ratio is extracted and converted to digital. For those embodiments only one analog to digital converter is required in the receiver.

A preferred embodiment uses a special flash analog to digital circuit developed for the present invention. The circuit consists of several sets of flash analog digital circuits. The flash consists of two arrays. The first array consists of ten flash circuits vertically and six horizontal for sixty circuits in all. The first set of ten is the most significant number, with six being the least significant. This allows it to measure a number as large as 999,999, but, however, larger arrays can be used for any size number.

A calibration circuit 29 compares the digital values from the positive-to-negative offset analog to digital convertor 28 for each channel with the transmission digital value for the positive-to-negative offset and a calibration factor is determined which accounts for losses or noise. The positive-to-negative ratio values from the positive-to-negative ratio analog to digital convertor 27 for each channel are then calibrated through the use of this calibration factor and the digital output signals 47 are generated. In this way the original digital signals input to the transmission apparatus are obtained for each channel. The reproduced signals 47 for each signal source are then available for use or dissemination by the intended users.

Under a preferred embodiment of the invention, a master control circuit 15 monitors a multi-media network to determine the time slot to be allocated to the various incoming signals. A signal source wanting to use the network would first address the master control circuit 15 to request access to the network. The main control circuit then allocates a time slot that is not being used.

Referring again to FIG. 1, under a preferred embodiment of the invention, if an acceptable initiating signal is received by the master control circuit 15, the incoming signal is allocated an unused time slot channel. Successive cycles of the time slot then carry the latest information pulse for the source. The converted analog signals for each channel are updated with each synchronization cycle.

The receiving apparatus 16 can be deployed at a single location with information dissemination occurring from the single location or can be deployed at a plurality of locations with users tuning in to the desired signals.

Under a preferred embodiment, depending upon the type of signal source of the respective channels, the minimum frequency of the synchronization pulse is the minimum frequency that will permit an acceptably accurate reproduction of the input digital signal. For data transmission applications which require precise reproduction of transmitted data, the frequency of the synchronization pulse must be at least as high as the frequency of the change of the digital source signal.

An embodiment of the invention provides an apparatus and method that would allow substantially faster computer networks. Substantially more computers could be added to any given network without degrading the network's speed. In computer networking the present invention will speed up the data transfer rates and make computer networking more efficient. It will allow for more computers to be used on a network without degrading the network. It will also allow monitors, hard drives, printers and other devices at separate addresses all to be connected together by a single link. This link could be wire, fiber optics, or wireless communication, with each component allocated a time slot channel.

Another embodiment of the invention provides for enhancement of interactive robotics. Each component of a robotics device would be controlled by a single signal with each component accessing a time slot channel. This would make it possible for work to be accomplished in a hazardous area without exposing the operator to physical risk associated with the environment and wearing a suit as designed with sensors to detect movement, touch and sight, and then transmit these movements or essential perceptions to the robot. The robot would then transmit back what it was doing, and what it was sensing. The operator in the suit would then feel what the robot was feeling, what it was seeing and what it was doing instantaneously.

Another embodiment of the apparatus and method provides for the transmission of voice data to specific addresses based upon the time slot channel allocated.

Another embodiment of the invention provides for the simultaneous transmission of a large number of video recordings. Thousands of video recordings can be transmitted simultaneously allowing users to make a selection of any of the videos at any time.

Another embodiment provides for radio and television signal transmission. The present invention greatly increases the channel capacity for the band width allowed. Furthermore, this embodiment of the invention allows the routing of specific channels to specific locations. This allows users to access a tremendous video library from their homes. It, likewise, allows users to access books at public and private libraries. It allows students to complete school work at home and to interact with their instructors as well as other students. This allows more channels for radio, televisions and cellular telephones. Furthermore, not only would the number of channels be increased, but channels would be of digital quality.

An embodiment of the invention enhances the operation of video recorders by allowing them to operate on a digital format. This embodiment also allows the replacement of the revolving head with a fixed head, which makes them more reliable and more compact. Likewise, embodiments of the invention as applied to audio recorders allow audio recorders to be made digital.

Another embodiment of the invention provides for the expansion of the capacity of cellular phone networks by assigning each call to an unallocated time slot for simultaneous transmission and then deleting the call from the network upon completion of the call, making the channel available for other users and other callers.

Under preferred embodiments of the invention, neither the positive-to-negative offset nor the positive-to-negative ratio would be modulated onto a carrier wave. However, the present invention could be used to modulate a carrier wave. In fact, under other embodiments of the invention, the positive-to-negative offset and the positive-to-negative ratio could be modulated onto an FM, PM, or PWM carrier wave. For example, the positive and negative information pulse segments could be superimposed upon the peak for the carrier wave. This would allow the information pulses to be removed and the information recovered without affecting the information being transmitted by the other modulation methods. After the pulses are recovered, the positive-to-negative offset and the positive-to-negative ratio would then be analyzed in the same manner as is provided for the preferred embodiments described above. The process of adding the pulses to the respective carriers uses the process of finding the high or the low points of each cycle and superimposing the information pulses, if desired, to the selected points. Under such embodiments, a synchronization pulse would not ordinarily be used as the channel identification would arise from carrier wave identification.

An embodiment of the present invention provides for the substantial increase in the capacity of existing telephone systems. The simultaneous transmission of numerous calls from a single signal could greatly increase the capacity of existing facilities. Alternatively switching circuits could be much smaller and would be able to provide more reliable service.

Another embodiment of the invention provides for home stereos to transmit specific information to specific speakers. For example, one speaker could be for drums, one for the piano, one for brass instruments, one for strings. One could have the whole orchestra in the living room. Furthermore, the components could be connected by a single wire or the central unit could be entirely wireless.

Another embodiment of the present invention provides for shelf tags in grocery stores. Each electronic grocery store shelf price tag has its own address for each item allowing for instantaneous update of item and price changes. Each product has its own time slot and the transmission can be wireless, allowing complete freedom of location for the shelf tags.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. An apparatus for digital information transfer comprising:
   a) means for allocating one or more source digital signals to unique, repetitive time slots;
   b) means for generating an analog information wave for each said source digital signal, each said information wave having a positive wave segment and a negative wave segment and having a positive-to-negative ratio which is a function of the magnitude of the corresponding source digital signal as measured during the allocated time slot for the signal;
   c) means for transmitting each of the analog information waves within its allocated time slot;

11 d) means for receiving each of the analog information waves within its allocated time slot;

e) means for extracting a positive-to-negative ratio for each analog information wave received during its allocated time slot; and f) means for generating an output digital signal for each information wave received during its allocated time slot, said output digital signal having a digital magnitude which is a function of said extracted positive-to-negative ratio.

2. An apparatus as claimed in claim 1 further comprising:

a) means for transmitting each information wave with a pre-set positive-to-negative offset;

b) means for extracting a positive-to-negative offset for each analog information wave received during its allocated time slot; and c) means for calibrating the output digital signal magnitudes by comparison of the positive-to-negative offsets of the information waves as transmitted and the positive-to-negative offsets of the information waves as received.

3. An apparatus as claimed in claim 1 wherein the means for generating said analog information waves for said source digital signals and the means for transmitting the information waves within the allocated time slots are deployed at a plurality of transmission locations.

4. An apparatus as claimed in claim 1 wherein the means for receiving the information waves within the allocated time slots, the means for extracting the positive-to-negative ratios for the analog information waves received during the allocated time slots, and the means for generating output digital signals with digital magnitudes which are a function of said extracted positive-to-negative ratios for the information waves received are deployed at a plurality of receiving locations.

5. An apparatus as claimed in claim 1 wherein the means for generating analog information waves generates an information wave for each said source digital signal the positive-to-negative ratio of which is proportional to the magnitude of the corresponding source digital signal as measured during the allocated time slot for the signal.

6. An apparatus as claimed in claim 1 wherein the means for generating output digital signals generates output digital signals having magnitudes which are proportional to the extracted positive-to-negative ratios for the information waves received.

7. An apparatus for digital information transfer comprising:

a) means for generating synchronizing waves of pre-set wave form and frequency;

b) means for allocating one or more source digital signals to unique time slots between successive synchronizing waves;

c) means for generating an analog information wave for each source digital signal, said information wave having a positive wave segment and a negative wave segment, said information wave having a positive-to-negative ratio which is a function of the magnitude of the corresponding source digital signal as measured during the allocated time slot for the source digital signal, and said information wave having a pre-set positive-to-negative offset;

d) means for transmitting the information wave for each source digital signal within its allocated time slot;

e) means for receiving the information wave for each source digital signal during the allocated time slot for

12 the source digital signal as referenced to successive synchronizing waves;

f) means for extracting a positive-to-negative offset and a positive-to-negative ratio for each information wave received during its allocated time slot;

g) means for generating an output digital signal for each information wave received during its allocated time slot, said output digital signal having a digital magnitude which is a function of said extracted positive-to-negative ratio; and h) means for calibrating the digital magnitude of each output digital signal by comparison of the positive-to-negative offset of the corresponding information wave as transmitted with the positive-to-negative offset of the information wave as received.

8. An apparatus as claimed in claim 7 wherein the means for generating an analog information wave for each source digital signal and the means for transmitting the information wave for each source digital signal within its allocated time slot are deployed at a plurality of transmission locations.

9. An apparatus as claimed in claim 7 wherein the means for receiving the information wave for each source digital signal during its allocated time slot, the means for extracting said positive-to-negative offset and said positive-to-negative ratio for each information wave received during its allocated time slot, the means for generating an output digital signal for each information wave received during its allocated time slot which is a function of the extracted positive-to-negative ratio, and the means for calibrating the digital magnitude of each output digital signal are deployed at a plurality of receiving locations.

10. An apparatus as claimed in claim 7 wherein the means for generating analog information waves generates an information wave for each said source digital signal the positive-to-negative ratio of which is proportional to the magnitude of the corresponding source digital signal as measured during the allocated time slot for the signal.

11. An apparatus as claimed in claim 7 wherein the means for generating output digital signals generates output digital signals having magnitudes which are proportional to the extracted positive-to-negative ratios for the information waves received.

12. An apparatus for digital information transfer comprising:

a) a synchronization wave generation circuit;

b) a circuit for allocating one or more source digital signals to unique time slots between successive synchronizing waves;

c) one or more digital to analog signal generators for generating an analog information wave for each source digital signal, which information wave has a positive wave segment and a negative wave segment and has a positive-to-negative ratio which is a function of the digital magnitude of the corresponding source digital signal as measured during the allocated time slot for the source digital signal, and which information wave has a pre-set positive-to-negative offset;

d) one or more transmitters for transmitting the information wave for each source digital signal within its allocated time slot;

e) one or more receivers for receiving the information wave for each source digital signal within the allocated time slot for the source digital signal as referenced to successive synchronization waves;

f) one or more circuits for extracting the positive-to-negative ratio and the positive-to-negative offset of each information wave received during its allocated time slot;

g) one or more analog to digital convertors for generating an output digital signal for each information wave received during its allocated time slot, said output digital signal having a digital magnitude which is a function of said extracted positive-to-negative ratio;

h) one or more circuits for calibrating the digital magnitude of each output digital signal by comparison of the positive-to-negative offset of the corresponding information wave as transmitted with the positive-to-negative offset of the information wave as received.

13. An apparatus as claimed in claim 12 wherein the digital to analog signal generators for generating an analog information wave for each source digital signal within its allocated time slot and the transmitters for transmitting the information wave for each source digital signal within its allocated time slot are deployed at a plurality of transmission locations.

14. An apparatus as claimed in claim 12 wherein the receivers, the circuits for extracting the positive-to-negative ratio and the positive-to-negative offset of each information wave received during its allocated time slot, the analog to digital convertors for generating an output digital signal for each information wave received during its allocated time slot, and the circuits for calibrating the digital magnitude of each output digital signal are deployed at a plurality of receiving locations.

15. An apparatus as claimed in claim 12 wherein the digital to analog signal generators generate an information wave for each said source digital signal the positive-to-negative ratio of which is proportional to the magnitude of the corresponding source digital signal as measured during the allocated time slot for the signal.

16. An apparatus as claimed in claim 12 wherein the analog to digital signal generators generate output digital signals having digital magnitudes which are proportional to the extracted positive-to-negative ratios for the information waves received.

17. An apparatus for digital information transfer comprising:

a) means for generating synchronizing waves of pre-set wave form and frequency;

b) means for transmitting said synchronizing waves to one or more remote transmission locations;

c) means for receiving said synchronizing waves at each remote transmission location;

d) means for allocating one or more source digital signals at each remote transmission location to unique time slots between successive synchronizing waves;

e) means for generating an analog information wave for each source digital signal, said information wave having a positive wave segment and a negative wave segment, said information wave having a positive-to-negative ratio which is a function of the magnitude of the corresponding source digital signal as measured during the allocated time slot for the source digital signal, and said information wave having a pre-set positive-to-negative offset;

f) means for transmitting the information wave for each source digital signal from each remote transmission location;

g) means for receiving, at one or more locations, the information wave for each source digital signal transmitted from each remote transmission location, the information wave being received within its allocated time slot as referenced to successive synchronization waves;

h) means for extracting a positive-to-negative offset and a positive-to-negative ratio for each information wave received during its allocated time slot at one or more locations;

i) means for generating an output digital signal for each information wave received during its allocated time slot, said output digital signal having a digital magnitude which is a function of said extracted positive-to-negative ratio; and j) means for calibrating the digital magnitude of each output digital signal by comparison of the positive-to-negative offset of the corresponding information wave as transmitted with the positive-to-negative offset of said information wave as received.

18. An apparatus as claimed in claim 17 wherein the means for generating analog information waves generates an information wave for each said source digital signal the positive-to-negative ratio of which is proportional to the magnitude of the corresponding source digital signal as measured during the allocated time slot for the signal.

19. An apparatus as claimed in claim 17 wherein the means for generating output digital signals generates output digital signals having magnitudes which are proportional to the extracted positive-to-negative ratios for the information waves received.

20. A method for digital information transfer comprising the steps of:

a) allocating one or more source digital signals to unique, repetitive time slots;

b) generating an analog information wave for each said source digital signal, each said information wave having a positive wave segment and a negative wave segment and having a positive-to-negative ratio which is a function of the magnitude of the corresponding source digital signal as measured during the allocated time slot for the signal;

c) transmitting each of the analog information waves within its allocated time slot;

d) receiving each of the analog information waves within its allocated time slot;

e) extracting a positive-to-negative ratio for each analog information wave received during its allocated time slot; and f) generating an output digital signal for each information wave received during its allocated time slot, said output digital signal having a digital magnitude which is a function of said extracted positive-to-negative ratio.

21. Method claimed in claim 20 further comprising the steps of:

a) transmitting each said information wave with a pre-set positive-to-negative offset;

b) extracting a positive-to-negative offset for each analog information wave received during its allocated time slot; and c) calibrating the output digital signal magnitudes by comparison of the positive-to-negative offsets of the information waves as transmitted and the positive-to-negative offsets of the information waves as received.

22. Method claimed in claim 20 wherein the step of generating said analog information waves for said source digital signals and the step of transmitting the information waves within the allocated time slots are performed at a plurality of transmission locations.

23. Method claimed in claim 20 wherein the step of receiving the information waves within the allocated time slots, the step of extracting the positive-to-negative ratios for the analog information waves received during the allocated time slots, and the step of generating output digital signals with digital magnitudes which are a function of said extracted positive-to-negative ratios for the information waves received are performed at a plurality of receiving locations.

24. Method claimed in claim 20 wherein the step of generating analog information waves generates an information wave for each said source digital signal the positive-to-negative ratio of which is proportional to the magnitude of the corresponding source digital signal as measured during the allocated time slot for the signal.

25. Method claimed in claim 20 wherein the step of generating output digital signals generates output digital signals having magnitudes which are proportional to the extracted positive-to-negative ratios for the information waves received.

26. A method for digital information transfer comprising the steps of:
 a) generating synchronizing waves of pre-set wave form and frequency;
 b) allocating one or more source digital signals to unique time slots between successive synchronizing waves;
 c) generating an analog information wave for each source digital signal, said information wave having a positive wave segment and a negative wave segment, said information wave having a positive-to-negative ratio which is a function of the magnitude of the corresponding source digital signal as measured during the allocated time slot for the source digital signal, and said information wave having a pre-set positive-to-negative offset;
 d) transmitting the information wave for each source digital signal within its allocated time slot;
 e) receiving the information wave for each source digital signal during the allocated time slot for the source digital signal as referenced to successive synchronizing waves;
 f) extracting a positive-to-negative offset and a positive-to-negative ratio for each information wave received during its allocated time slot;
 g) generating an output digital signal for each information wave received during its allocated time slot, said output digital signal having a digital magnitude which is a function of said extracted positive-to-negative ratio; and
 h) calibrating the digital magnitude of each output digital signal by comparison of the positive-to-negative offset of the corresponding information wave as transmitted with the positive-to-negative offset of the information wave as received.

27. Method claimed in claim 26 wherein the step of generating an analog information wave for each source digital signal and the step of transmitting the information wave for each source digital signal within its allocated time slot are performed at a plurality of transmission locations.

28. Method claimed in claim 26 wherein the step of receiving the information wave for each source digital signal during its allocated time slot, the step of extracting said positive-to-negative offset and said positive-to-negative ratio for each information wave received during its allocated time slot, the step of generating an output digital signal for each information wave received during its allocated time slot which is a function of the extracted positive-to-negative ratio, and the step of calibrating the digital magnitude of each output digital signal are performed at a plurality of receiving locations.

29. Method claimed in claim 26 wherein the step of generating analog information waves generates an information wave for each said source digital signal the positive-to-negative ratio of which is proportional to the magnitude of the corresponding source digital signal as measured during the allocated time slot for the signal.

30. Method claimed in claim 26 wherein the step of generating output digital signals generates output digital signals having magnitudes which are proportional to the extracted positive-to-negative ratios for the information waves received.

31. A method for digital information transfer comprising the steps of:
 a) generating synchronizing waves of pre-set wave form and frequency;
 b) transmitting said synchronizing waves to one or more remote transmission locations;
 c) receiving said synchronizing waves at each remote transmission location;
 d) allocating one or more source digital signals at each remote transmission location to unique time slots between successive synchronizing waves;
 e) generating an analog information wave for each source digital signal, said information wave having a positive wave segment and a negative wave segment, said information wave having a positive-to-negative ratio which is a function of the magnitude of the corresponding source digital signal as measured during the allocated time slot for the source digital signal, and said information wave having a pre-set positive-to-negative offset;
 f) transmitting the information wave for each source digital signal from each remote transmission location;
 g) receiving, at one or more locations, the information wave for each source digital signal transmitted from each remote transmission location, the information wave being received within its allocated time slot as referenced to successive synchronization waves;
 h) extracting a positive-to-negative offset and a positive-to-negative ratio for each information wave received during its allocated time slot at one or more locations;
 i) generating an output digital signal for each information wave received during its allocated time slot, said output digital signal having a digital magnitude which is a function of said extracted positive-to-negative ratio; and
 j) calibrating the digital magnitude of each output digital signal by comparison of the positive-to-negative offset of the corresponding information wave as transmitted with the positive-to-negative offset of the information wave as received.

32. Method claimed in claim 31 wherein the step of generating analog information waves generates an information wave for each said source digital signal the positive-to-negative ratio of which is proportional to the magnitude of the corresponding source digital signal as measured during the allocated time slot for the signal.

33. Method claimed in claim 31 wherein the step of generating output digital signals generates output digital signals having magnitudes which are proportional to the extracted positive-to-negative ratios for the information waves received.

34. An apparatus as claimed in claim 1 wherein the means for generating an analog information wave for each said source digital signal further includes a means for simultaneously generating and adding analog signals for two or more source signals for a single information wave.

35. An apparatus as claimed in claim 7 wherein the means for generating an analog information wave for each source digital signal further includes a means for simultaneously imputing two or more source digital signals, generating an analog information signal for each source digital signal, and combining the analog information signals of said two or more source digital signals for a single information wave.

36. An apparatus as claimed in claim 12 further including one or more additional digital to analog signal generators to permit the simultaneous input of two or more source digital signals and including a circuit for combining the analog signals for said two or more source digital signals for a single analog information wave.

37. An apparatus as claimed in claim 17 wherein the means for generating an analog information signal for each source digital signal further includes a means for simultaneously imputing two or more source digital signals, generating an analog information signal for each source digital signal, and combining the analog signals for a single information wave.

38. Method claimed in claim 20 wherein the step of generating an analog information wave for each said source digital signal further includes a step of simultaneously generating and adding analog signals for two or more source signals for a single information wave.

39. Method claimed in claim 26 wherein the step of generating an analog information wave for each source digital signal further includes a step of simultaneously imputing two or more source digital signals, generating an analog information signal for each source digital signal, and combining the analog information signals of said two or more source digital signals for a single information wave.

40. Method claimed in claim 31 wherein the step of generating an analog information signal for each source digital signal further includes a step of simultaneously imputing two or more source digital signals, generating an analog information signal for each source digital signal, and combining the analog signals for a single information wave.

41. An apparatus for digital information transfer comprising:

a) a synchronization wave generation circuit;

b) a circuit for allocating one or more source digital signals to unique time slots between successive synchronizing waves;

c) two or more digital to analog signal generators for simultaneously receiving two or more source digital signals which are allocated the same time slot, simultaneously generating an analog information signal for each of said two or more source digital signals;

d) a circuit for combining said analog information signals for a single combined analog information wave, which combined information wave has a positive wave segment and a negative wave segment and has a positive-to-negative ratio which is a function of the digital magnitudes of the corresponding two or more source digital signals as measured during the allocated time slot for the source digital signals, and which combined information wave has a pre-set positive-to-negative offset;

e) one or more transmitters for transmitting each combined information wave within its allocated time slot;

f) one or more receivers for receiving the combined information wave within the allocated time slot for the source digital signals as referenced to successive synchronization waves;

g) one or more circuits for extracting the positive-to-negative ratio and the positive-to-negative offset of each combined information wave received during its allocated time slot;

h) one or more analog to digital convertors for generating an output digital signal for each combined information wave received during its allocated time slot, said output digital signal having a digital magnitude which is a function of said extracted positive-to-negative ratio;

i) one or more circuits for calibrating the digital magnitude of each output digital signal by comparison of the positive-to-negative offset of the corresponding combined information wave as transmitted with the positive-to-negative offset of the combined information wave as received.

42. An apparatus as claimed in claim 41 wherein the digital to analog signal generators for simultaneously generating an analog information signal for two or more source digital signals within the allocated time slot, the circuit for combining the analog information signals for a single combined analog information wave, and the transmitters for transmitting the combined information wave within its allocated time slot are deployed at a plurality of transmission locations.

43. An apparatus as claimed in claim 41 wherein the receivers for receiving the combined information wave within the allocated time slot for the source digital signals as referenced to successive synchronization waves, the circuits for extracting the positive-to-negative ratio and the positive-to-negative offset of each combined information wave received during its allocated time slot, the analog to digital convertors for generating an output digital signal for each combined information wave received during its allocated time slot, and the circuits for calibrating the digital magnitude of each output digital signal by comparison of the positive-to-negative offset of the corresponding combined information wave as transmitted with the positive-to-negative offset of the combined information wave as received are deployed at a plurality of receiving locations.

44. An apparatus as claimed in claim 41 wherein the circuit for combining the analog information signals for the two or more source digital signals for a combined analog information wave generates a combined information wave the positive-to-negative ratio of which is proportional to the combined magnitude of the corresponding source digital signals as measured during the allocated time slot.

45. An apparatus as claimed in claim 41 wherein the analog to digital signal generators generate output digital signals having digital magnitudes which are proportional to the extracted positive-to-negative ratios for the combined information waves as received.

46. An apparatus as claimed in claim 1 wherein the means for generating an analog information wave further provides for generating a zero wave segment between the positive wave segment and the negative wave segment, and the means for extracting a positive-to-negative ratio for each analog information wave received during its allocated time slot further provides for a zero correction of the zero wave segment, thereby interposing an interim zero correction on the positive wave segment and the negative wave segment as received.

47. An apparatus as claimed in claim 7 wherein the means for generating an analog information wave for each source digital signal further provides for generating a zero wave segment between the positive wave segment and the negative wave segment, and the means for extracting a positive-to-negative offset and a positive-to-negative ratio for each information wave received during its allocated time slot further provides for a zero correction of the zero wave segment, thereby interposing an interim zero correction on the positive wave segment and the negative wave segment.

48. An apparatus as claimed in claim 12 wherein the digital to analog signal generators further generate a zero wave segment between the positive wave segment and the negative wave segment, and the circuits for extracting the positive-to-negative ratio and the positive-to-negative offset of each information wave received during its allocated time slot further provide for a zero correction of the zero wave segment, thereby interposing an interim zero correction on the positive wave segment and the negative wave segment.

49. An apparatus as claimed in claim 17 wherein the means for generating an analog information wave for each source digital signal further provides for generating a zero wave segment between the positive wave segment and the negative wave segment, and the means for extracting a positive-to-negative offset and a positive-to-negative ratio for each information wave received during its allocated time slot further provides for a zero correction of the zero wave segment, thereby interposing an interim zero correction on the positive wave segment and the negative wave segment.

50. Method as claimed in claim 20 wherein the step of generating an analog information wave for each said source digital signal further includes generating a zero wave segment between the positive wave segment and the negative wave segment and the step of extracting a positive-to-negative ratio for each analog information wave received during its allocated time slot further includes the step of making a zero correction of the zero wave segment, thereby interposing an interim zero correction on the positive wave segment and the negative wave segment.

51. Method as claimed in claim 26 wherein the step of generating an analog information wave for each said source digital signal further includes generating a zero wave segment between the positive wave segment and the negative wave segment and the step of extracting a positive-to-negative ratio for each analog information wave received during its allocated time slot further includes the step of making a zero correction of the zero wave segment, thereby interposing an interim zero correction on the positive wave segment and the negative wave segment.

52. Method as claimed in claim 31 wherein the step of generating an analog information wave for each said source digital signal further includes generating a zero wave segment between the positive wave segment and the negative wave segment and the step of extracting a positive-to-negative ratio for each analog information wave received during its allocated time slot further includes the step of making a zero correction of the zero wave segment, thereby interposing an interim zero correction on the positive wave segment and the negative wave segment.

53. An apparatus as claimed in claim 41 wherein the circuit for combining said analog information signals for a single combined analog information wave further generates a zero wave segment between the positive wave segment and the negative wave segment, and the circuits for extracting the positive-to-negative ratio and the positive-to-negative offset of each combined information wave received during its allocated time slot further provide for a zero correction of the zero wave segment, thereby interposing an interim zero correction on the positive wave segment and the negative wave segment.

\* \* \* \* \*